United States Patent Office 3,641,020
Patented Feb. 8, 1972

3,641,020
SYNTHESIS OF CYANURIC FLUORIDE
Richard W. Anderson and Hughie R. Frick, Midland, Mich., assignors to The Dow Chemical Company, Midland, Mich.
No Drawing. Filed Jan. 23, 1969, Ser. No. 793,596
Int. Cl. C07d 55/42
U.S. Cl. 260—248 CS         6 Claims

ABSTRACT OF THE DISCLOSURE

A process for the efficient synthesis of cyanuric fluoride is provided. The process comprises contacting certain cyanuric halides with selected alkali metal fluorides in the presence of a perhalocarbonyl compound. The process of the present invention provides for the production of cyanuric fluoride at considerably reduced temperatures, than those used in known processes.

---

The invention herein described was made in the course of, or under a contract or subcontract thereunder, with the Department of the Air Force.

This invention relates to a novel and improved process for the production of cyanuric fluoride and is particularly concerned with a process wherein said compounds are produced under moderate reaction conditions.

Known processes for the production of cyanuric fluoride comprise treating cyanuric chloride with a metal fluoride in a solvent at elevated temperatures for several hours. For example, in Journal of Organic Chemistry 25, 2016 (1960), Tullock and Coffman disclose the preparation of cyanuric fluoride by contacting cyanuric chloride with sodium fluoride, in the presence of a solvent, under conditions which require heating the reaction mixture to 248° C. The process of the present invention, however, provides for the production of cyanuric fluoride at considerably reduced temperatures, i.e., at temperatures which fail to produce appreciable product by process known heretofore.

It is a principal object of this invention to provide a process for preparing cyanuric fluoride which can be efficiently carried out under moderate reaction conditions, especially lower reaction temperatures.

It is another object of this invention to provide novel catalyst for the production of cyanuric fluoride.

These and other objects and advantages will become apparent from the detailed description present hereinafter.

The present invention is a process for preparing cyanuric fluoride which comprises contacting a cyanuric halide which contains at least one halogen other than F, with an alkali metal fluoride, in the presence of a perhalogenated carbonyl compound as catalyst.

Cyanuric fluoride prepared by the process of the present invention is suitable for use as intermediates in the preparation of cyanogen fluoride, other perfluorocarbons such as tetrafluoromethane, hexafluoroethane, tetrafluoroethane, trifluoroacetonitrile and like materials.

DESCRIPTION OF PREFERRED EMBODIMENTS

In accordance with a preferred embodiment of the present invention, cyanuric fluoride is prepared by contacting a cyanuric halide, other than cyanuric fluoride with an alkali metal fluoride, in the presence of a perfluorocarbonyl compound. The preferred cyanuric halide is cyanuric chloride.

Suitable alkali metal fluorides are potassium fluoride, cesium fluoride and rubidium fluoride. The preferred alkali metal fluoride is cesium fluoride. Perhalo-carbonyl compounds, containing from about 1 to about 20 carbon atoms, are preferred as catalysts.

Particularly preferred perfluorocarbonyl compounds are carbonyl fluoride, perfluoroacetone and perfluorooctanoylfluoride.

A solvent may be introduced to the reaction vessel as a dilutant. Solvents suitable for use are those aprotic polar organic liquids which are inert to the reactants and products and which will dissolve these materials and remain liquid at the reaction temperature. Conveniently, higher boiling liquids such as N,N-dimethyl formamide, acetonitrile, tetramethylene sulfone, N,N-dimethylacetamide and the like are employed as solvents.

Normally in the practice of the present invention, the perhalo-carbonyl compound and the alkali metal fluoride are added to the reaction vessel before the cyanuric halide. The ratio of alkali metal fluoride to perhalo-carbonyl compound is not critical. Since the perhalo-carbonyl compound is regenerated during the reaction, a catalytic amount may be employed, i.e. less than that which is stoichiometrically required for the reaction to go to completion. It is preferred that the molar ratio of alkali metal fluoride to perhalo-carbonyl compound be greater than about 1:1. The cyanuric halide is then added, usually in the presence of the inert solvent.

The reaction is carried out at a temperature within the range of from about the freezing point of the system to about the boiling point of the system when the catalyst used is carbonyl fluoride or a primary perhalocarbonyl compound. When the catalyst is carbonyl fluoride, temperatures above about 0° C. are preferred for maximum conversion to the desired product.

When a perhalo ketone is used as the catalyst and the molar ratio of alkali metal fluoride to a perhalo ketone employed as the catalyst is greater than about 1:1, the reaction is carried out from within the temperature range of from about 5° C. to a maximum temperature determined by the boiling point of the system.

When a perhalo ketone is employed as catalyst and the molar ratio of alkali metal fluoride to the catalyst is less than about 1:1, the reaction is carried out within the temperature of from about 25° C. to a maximum temperature which is determined by the boiling point of the system.

After the reaction has been carried out for a period of the sufficient to permit the product to form, the product is distilled and recovered.

Normally the reaction is run in the presence of a solvent with the reaction mass being continuously agitated during the reaction period.

The process usually is carried out under the autogenous pressure of the reaction mixture but either higher or lower pressures can be used.

The relative quantities of cyanuric halide reactant and alkali metal fluoride to be employed are not critical. Usually at a minimum of about stoichiometric amounts, as needed to provide a predetermined degree of fluorination, are employed. When a cyanuric halide containing no fluorine is the starting material, the molar ratio of alkali metal fluoride to cyanuric halide reactant is, preferably, at a minimum about 3:1.

Alternatively, the cyanuric halide reactant, perhalocarbonyl compound and alkali metal fluoride can be introduced at the same time into a reaction vessel along with the solvent.

Following the reaction period, usually the volatile components of the product mass are vacuum transferred and the desired product separated from the transferate by fractional distillation, vapor phase chromatography or other liquid-liquid separatory procedures.

The following examples will serve to further illustrate the present invention:

EXAMPLE I

In an inert atmosphere, 5.8 g. (0.10 mole) of KF and 100 cc. of dry acetonitrile was added to a 12 oz. glass pressure vessel. About 16.6 g. (0.10 mole) of hexafluoroacetone was vacuum transferred into the vessel, and the mixture was allowed to warm to room temperature and stirred magnetically until the hexafluoroacetone pressure was gone. The vessel was cooled to −60° C. and opened to allow addition of 6.15 g. (0.033 mole) of cyanuric chloride. Over a period of 20 hours this mixture was allowed to warm to 3° C., then it was warmed to 30° C. for 4 hours. Vacuum transfer of the volatile components yielded 15.6 g. of material. Separation by vapor phase chromatography resulted in 3.3 g. of cyanuric fluoride which was a 74% yield based on cyanuric chloride as the limiting substance.

EXAMPLE II

About 2.5 g. (0.043 mole) of KF, 17.9 g. (0.043 mole) of perfluorooctanoyl fluoride and 175 ml. of dry diglyme were placed in a glass pressure vessel in an inert atmosphere. This mixture was stirred magnetically at room temperature to form a complex. The reactor was cooled to −5° C., and opened in an inert atmosphere, and the 2.58 g. (0.014 mole) of cyanuric chloride was added. This mixture was stirred at −3° C. for 22 hours. Solid materials were then removed by pressure filtration while the solution was still cold, and any volatile materials were trapped at 196° C. About 9.6 g. (54% recovery) of acid fluoride was separated from the filtrate as an insoluble heavy layer. The remainder of the filtrate was distilled at 2 mm. pressure. It distilled at 63° C., and material in the receiver was pure diglyme. However, about 1.5 g. of fairly pure cyanuric fluoride was collected in a −196° C. trap. This was a 77% conversion based on cyanuric chloride as the limiting substance.

In a manner similar to that of the foregoing examples, the following reactions were run:

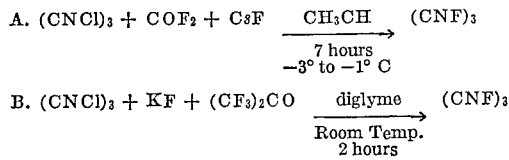

As a control and to demonstrate the utility of perhalocarbonyl compound as a catalyst in the preparation of cyanuric fluorides, the following reactions were run:

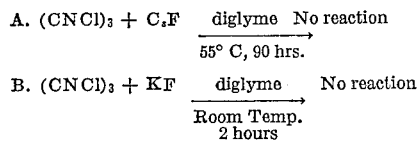

In a manner similar to the proceeding examples, cyanuric fluoride can be prepared by employing as catalysts the perhalo acyl halides, e.g. perhalopropanoylhalide, perhalopentanoylhalide, perhalooctanoylhalide, perhalodecanoylhalide, perhalotetradecanoylhalide, perhalooctadecanoylhalide and perhaloeiosanoylhalide, and perhalo ketones, e.g. perhalobutanone, perhalopentanone, perhalooctanone, perhalodecanone, perhalotetradecanone, perhalooctadecanone and perhaloeiosanone.

The above compounds in which the halogen is fluorine are especially useful as catalysts.

We claim:

1. In combination with the process for preparing cyanuric fluoride which comprises reacting a cyanuric halide containing at least one halogen atom other than fluorine with potassium, cesium or rubidium fluoride, the improvement which comprises:
   (a) contacting the cyanuric halide and alkali metal fluoride in the presence of carbonyl fluoride or a primary or secondary perhalo-carbonyl compound as catalyst;
   (b) (i) maintaining the temperature from the range within about the freezing point of the system to about the boiling point of the system when the catalyst is carbonyl fluoride or a primary perhalo-carbonyl compound,
   (ii) maintaining the temperature from the range within about 5° C. to a maximum determined by the boiling point of the system when the catalyst is a secondary perhalo-carbonyl compound and the molar ratio of alkali metal fluoride to the secondary perhalo-carbonyl compound is greater than about 1:1,
   (iii) maintaining the temperature from the range within about 25° C. to a maximum determined by the boiling point of the system when the catalyst is a secondary perhalo-carbonyl compound and the molar ratio of alkali metal fluoride to the secondary perhalo-carbonyl compound is less than about 1:1,
   (c) recovering the product.

2. The process of claim 1 wherein the perhalo-carbonyl compound is a perfluoro carbonyl compound containing no more than about 20 carbon atoms.

3. The process of claim 1 wherein the primary perhalo-carbonyl compound is perfluorooctanoyl fluoride.

4. The process of claim 1 wherein the secondary perhalo-carbonyl compound is perfluoro acetone.

5. The process of claim 1 wherein the alkali metal fluoride is cesium fluoride.

6. The process of cclaim 1 wherein the cyanuric halide is cyanuric chloride.

References Cited

UNITED STATES PATENTS 3,162,632  12/1964  Olstowski _____ 260—248
3,525,745  8/1970   Anderson _____ 260—248

JOHN M. FORD, Primary Examiner

U.S. Cl. X.R.

252—441